United States Patent

[11] 3,574,388

[72] Inventor Edwin A. Stone
 P. O. Box 1039, Chico, Calif. 95926
[21] Appl. No. 715,696
[22] Filed Mar. 25, 1968
[45] Patented Apr. 13, 1971

[54] CONVERTIBLE TRAILER
 4 Claims, 12 Drawing Figs.
[52] U.S. Cl. .................................................. 296/23,
 296/24
[51] Int. Cl. ..................................................... B60p 3/32
[50] Field of Search ......................................... 296/23,
 24.3

[56] References Cited
 UNITED STATES PATENTS
 238,243 3/1881 Mitchell ........................ 296/24.3
 FOREIGN PATENTS
 318,395 9/1929 Great Britain ................. 296/24.3
 1,131,985 10/1956 France ........................... 296/24.3

*Primary Examiner*—Philip Goodman
*Attorney*—Gregg and Hendricson

ABSTRACT: A trailer for hauling horses, and the like, which trailer is convertible for use as living quarters. The trailer includes a body comprising a bed, sidewalls, front wall, roof and rear doors. Wheel wells are provided inside the trailer at opposite sides thereof to accommodate extendible and retractable wheels. Combination inner sidewall and floor panels are pivotally mounted inside the trailer adjacent the bed and wheel wells, which panels are pivotally movable between generally vertical positions wherein they serve as inner sidewalls, and generally overlapping horizontal positions wherein they serve as a floor above the trailer bed. The retractable wheel mounting includes a pair of lever arms pivotally mounted on a common axis, one of which arms carries the wheel, and the other of which is releasably locked in fixed position. A coil spring and shock absorber is provided between the pair of arms. The wheels are retracted by releasing the lock and pivoting the wheels up into the wheel wells.

INVENTOR
EDWIN A. STONE

BY Gregg & Stidham
ATTORNEYS

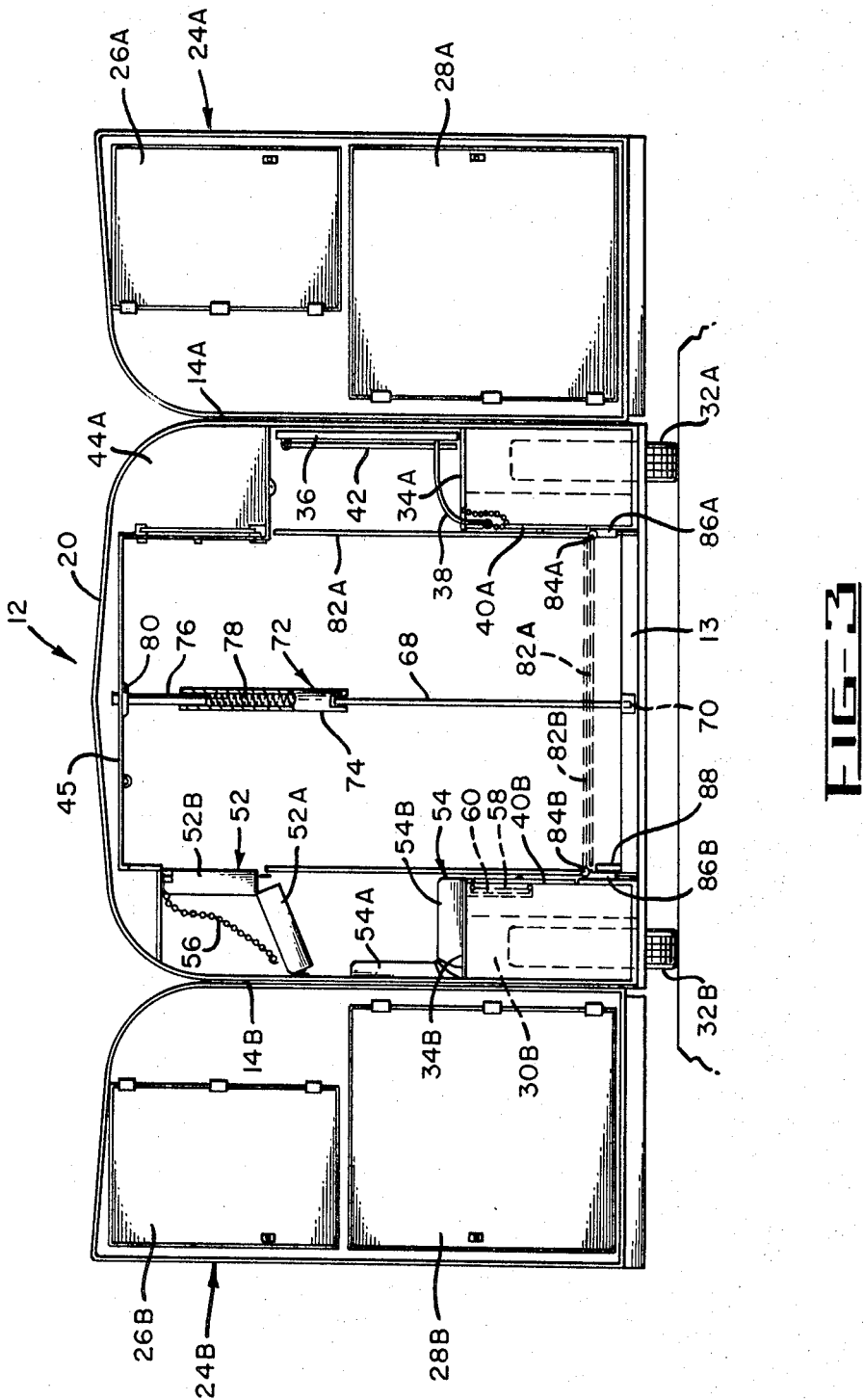

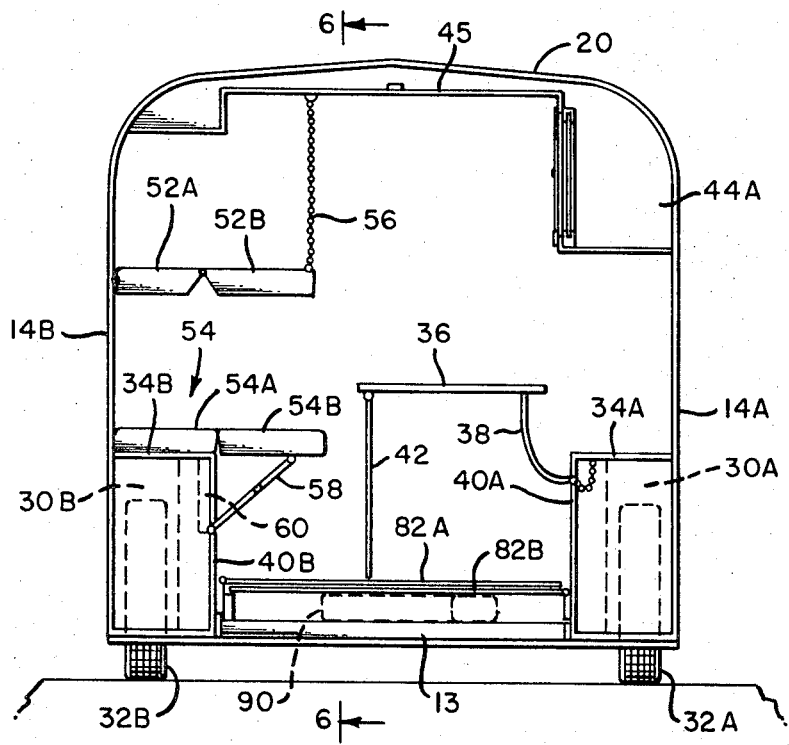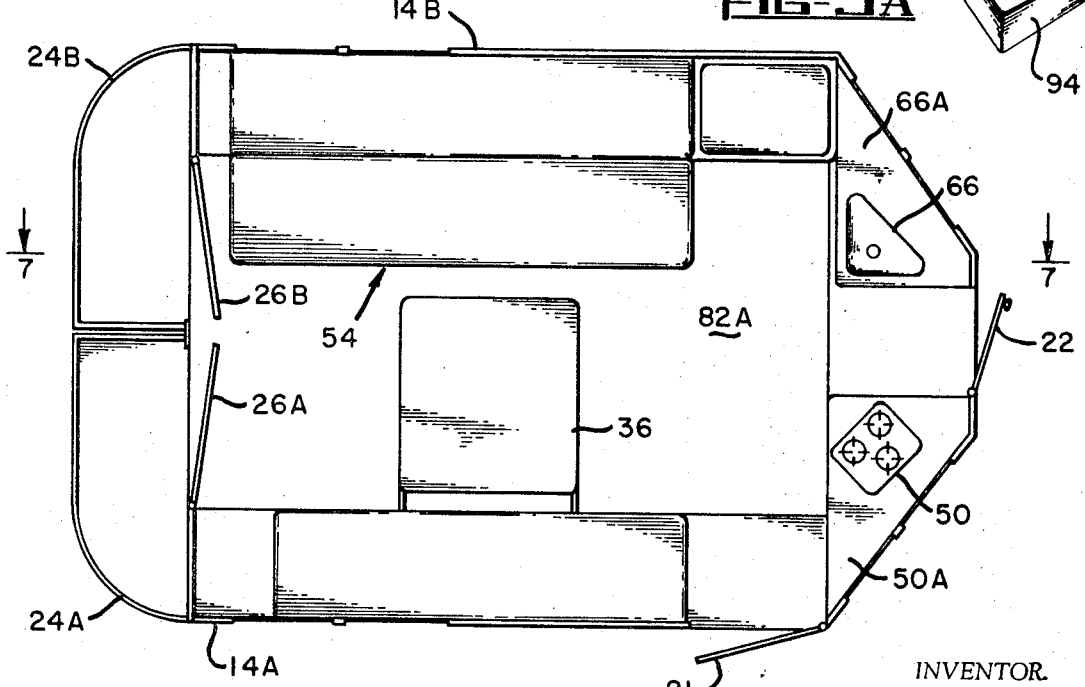

INVENTOR.
EDWIN A. STONE

BY Gregg & Stidham
ATTORNEYS

INVENTOR.
EDWIN A. STONE

BY Gregg & Stidham
ATTORNEYS

INVENTOR.
EDWIN A. STONE

BY Gregg & Stidham
ATTORNEYS

CONVERTIBLE TRAILER

This invention relates to a convertible trailer and more particularly to a trailer which may be converted from a camper or travel trailer to a closed utility type trailer for carrying horses, vehicles, supplies, implements, or the like.

Conventional trailers for hauling horses, motorcycles, racing cars, and the like, hereinafter termed utility-type trailers, are not well suited for use as a house trailer and, conversely, house or travel-type trailers used for living quarters are not well suited for use as utility trailers. Items such as horses, racing cars, motorcycles, and the like often are transported to and from a location by trailer where the trailer is parked. Often while at such location the trailer remains idle and unused. Applicant provides a trailer of greatly expanded use which trailer is readily converted between the utility and household types. For example, the trailer of this invention may be used as a horse trailer for the transportation of a horse or horses to a rodeo show, race or the like. At the destination the trailer is readily converted to provide living quarters while other accommodations are provided for the horse, or the horse is left outdoors. The use of the convertible trailer for human occupancy eliminates the need and expense of providing other living quarters.

An object of this invention is the provision of a novel convertible trailer which is readily and easily converted for use as either a utility-type or travel-type trailer.

To facilitate loading and unloading when used as a utility-type trailer, and to make entering and departing the trailer easier when used as living quarters, the trailer of this invention is provided with a vertically adjustable frame. Prior art trailers with vertically adjustable frames are known. However, many such arrangements do not include spring mountings for the wheels because of the added complexity and cost thereof.

An object of this invention is the provision of a simple yet effective spring mounting arrangement for trailer wheels included in the raising and lowering mechanism for vertically adjusting the height of the trailer frame and attached trailer body above ground.

The above and other objects and advantages of the invention will become apparent from the following description taken in conjunction with the drawings. In the drawings wherein like reference characters refer to the same parts in the several views:

FIG. 3 is a rear elevational view of the trailer showing the rear doors in open position and the trailer interior arranged for hauling horses;

FIG. 4 is a view which is similar to that of FIG. 3 but without the doors and showing the trailer interior converted for living quarters;

FIG. 5 is a horizontal sectional view taken substantially along line 5–5 of FIG. 2;

FIG. 5A is a perspective view of a manger for use with the trailer;

Figure 1:
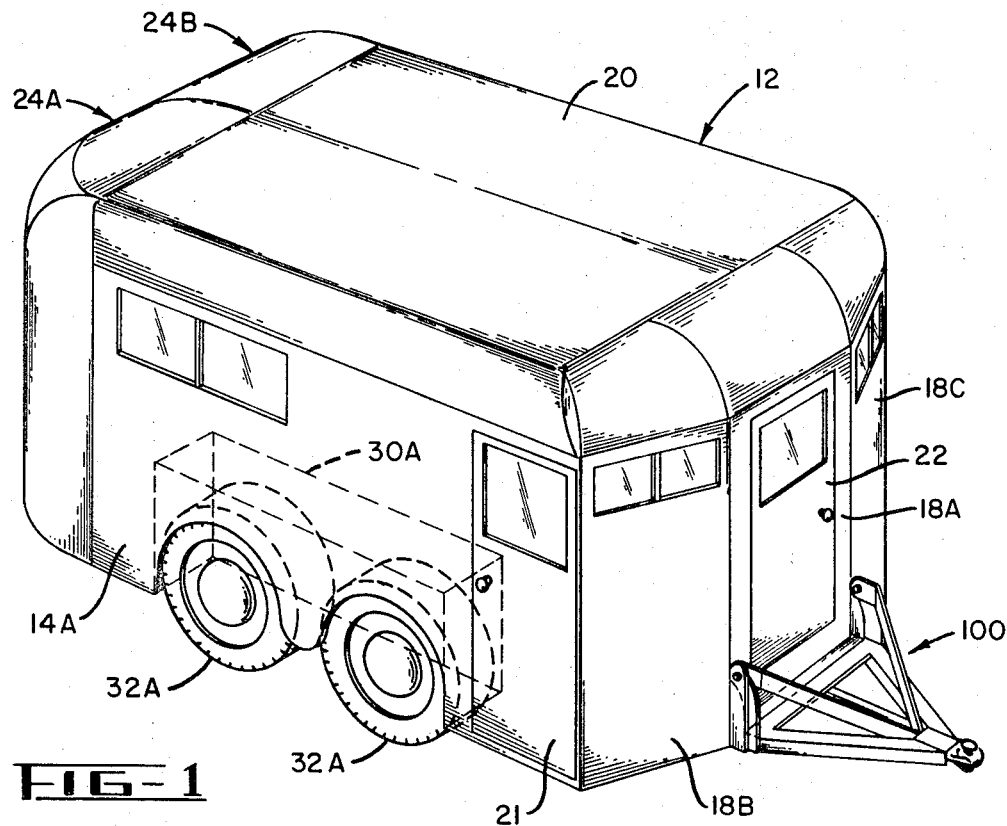
Fig. 1 is a perspective view showing a trailer embodying this invention.

Reference is made to FIGS. 1—7 wherein the trailer of this invention is shown comprising a trailer body 12 which includes a bed 13 having extending upwardly therefrom opposite outer sidewalls 14A and 14B and a front wall 18, and over which a top or roof 20 extends. The front wall 18 may be formed with a transversely extending forward section 18A and rearwardly angled side sections 18B and 18C. A door 22 is provided at the central forward section 18A which is particularly useful for entering and leaving the trailer when the trailer is loaded, as with horses. Also, a door 21 is provided adjacent the forward end of the sidewall 14A which is particularly adapted for use when the trailer is being used as living quarters.

The rear end of the trailer is provided with a pair of doors designated 24A and 24B which are hingedly secured to the rear edge of the sidewalls 14A and 14B respectively. Suitable handles and latching means, not shown, are provided for opening and closing the doors and latching the same closed. If desired, the doors 24A and 24B may be of boxlike construction. Cabinets with doors 26A, 28A and 26B, 28B may be provided inside the boxlike rear doors to provide closed storage space within the trailer. The upper cabinet doors 26A and 26B are of small enough size to be opened when the rear doors 24A and 24B are closed. To open the larger lower cabinet doors 28A and 28B the rear doors 24A and 24B first must be opened. Instead of the pivotally mounted doors 26A, 26B, 28A and and 28B other types doors could be used such as folding or sliding types, or the like. The interior of the cabinets formed by the boxlike rear doors may be provided with shelves, or the like, not shown. The large lower cabinets are particularly well suited for storing of animal feed, such as bales of hay.

Wheel wells 30A and 30B (FIG. 4) are formed at opposite sides of the trailer body to accommodate pairs of wheels 32A and 32B. Although tandem trailer wheels are shown, conventional dual or single wheel arrangements may be employed. The trailer body may be raised and lowered by extending the wheels from the wells and retracting the wheels into the same, respectively, and a novel wheel mounting arrangement is provided for the wheels which arrangement is described in detail below. For present purposes, it will be noted that the upper walls 34A and 34B of the wheel wells serve as bench tops for sitting and reposing when the trailer is utilized for living quarters as illustrated in FIGS. 4—7.

Figure 7:
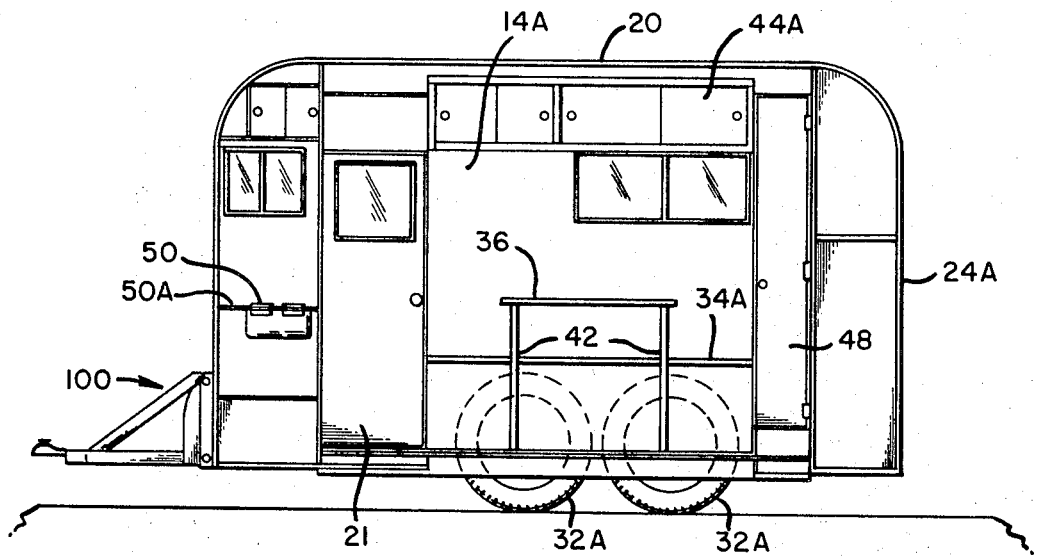
FIG. 7 is a longitudinal vertical cross-sectional view taken substantially along line 7–7 of FIG. 5.

The one bench 34A has associated therewith a table top 36 attached to brackets 38 pivotally secured to the inner sidewall 40A of the wheel well 30A. In the stored condition illustrated in FIG. 3, the table top is pivoted to a vertical position adjacent the outer wall 14A and fastened thereto by any suitable releasable fastening means, not shown. Table legs 42 hingedly secured to the table top 36 adjacent the outer edge thereof help to support the top in a vertical position when the trailer interior is unfolded in the manner illustrated in FIGS. 4, 5 and 7. Wall cabinets 44A may be provided adjacent the trailer ceiling 45 above the bench top 34A which cabinets are provided with sliding doors of conventional design. A narrow clothes closet 48 may be provided adjacent the rear end of the wall 14A as seen in FIG. 7. Also, as seen in FIGS. 5 and 7 a stove 50 may be located on a generally triangular-shaped counter 50A adjacent the forward wall section 18B.

The other side of the trailer interior is shown provided with foldable upper and lower bunks 52 and 54, respectively. The upper bunk 52 comprises a pair of hingedly connected sections 52A and 52B one of which sections 52A is pivotally attached to the sidewall 14B. The other section 52B is provided with supporting straps or chains 56 extending from the ceiling 45. In the unfolded condition illustrated in FIGS. 4 and 6, the sections 52A and 52B are secured together by any suitable means not shown, in a rigid horizontal position to provide a bunk for sleeping. In the folded condition, illustrated in FIG. 3, the outer free edge of the bunk section 52B is attached to the ceiling 45 by any suitable releasable fastening means not shown, whereby the section 52B extends generally vertically downwardly from the ceiling.

Figure 6:
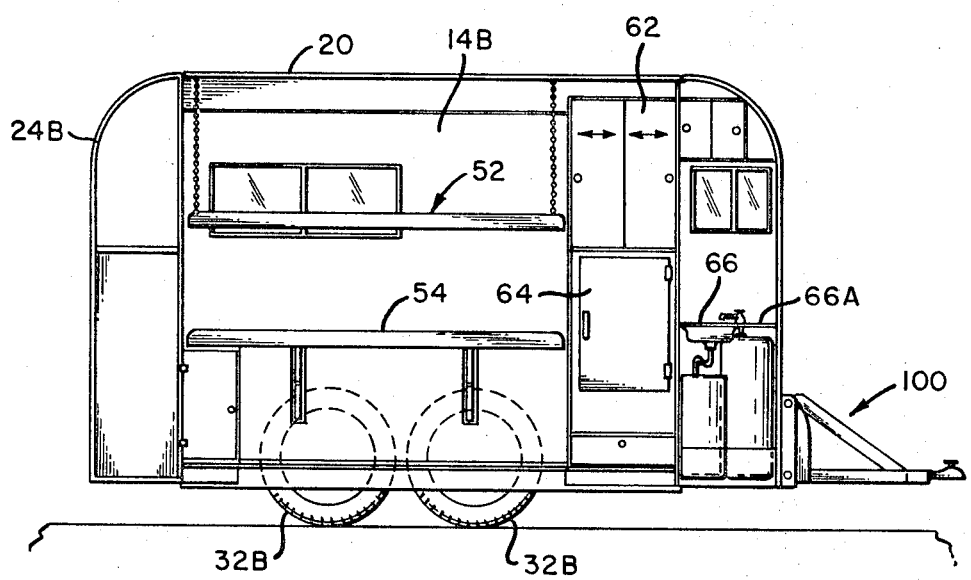
FIG. 6 is a longitudinal vertical cross-sectional view taken substantially along line 6–6 of FIG. 4.

The lower bunk 54 comprises hinged sections 54A and 54B one of which serves as a backrest and the other a seat cushion in the condition shown in FIG. 3. The seat cushion section 54B is provided with a pair of pivotal brackets 58 positioned in recesses 60 in the inner sidewall 40B of the wheel well 30B in the condition shown in FIG. 3. For use as a bunk, the cushions 54A and 54B are pulled away from the wall 14B to a position wherein the section 54A is supported upon the well top 34B and the section 54B extends horizontally outwardly therefrom as shown in FIGS. 4, 5 and 6. Means not shown lock the sections 54B and 54B in the horizontal position. A wall cabinet 62 adjacent the ceiling and a built-in refrigerator or ice chest 64 may be located forward of the bunks 54A and 54B as seen in FIG. 6. Also, as seen in FIGS. 5 and 6, a sink 66 may be located at a generally triangular-shaped counter 66A adjacent the forward wall section 18C. A passageway for the door 22 is provided between the sink and stove.

In accordance with this invention the trailer bed 13 serves as the main trailer floor when the trailer is employed as a utility trailer, as shown in FIG. 3. If the trailer is to be used for hauling animals, such as horses, a removable dividing panel 68 may be positioned at the longitudinal center of the trailer to provide a pair of animal stalls. Any suitable means may be employed for removably mounting the panel in the trailer. As illustrated in FIG. 3, the partition 68 may be provided with downwardly extending projections 70 (only one of which is illustrated in broken line view) which extend into apertures in the bed 13. The upper end of the partition may be held in position by telescoping spring biased upper supporting members 72, only one of which is seen. The upper supporting members may comprise a tubular body 74 with an axially movable rod 76 therewithin and extending from one thereof. A compression spring 78 resiliently urges the rod outwardly from the body. The lower end of the body 74 may be notched for engagement with the upper edge of the panel 68, and the movable rod may be provided with a flange 80 a spaced distance from the outer end thereof which engages the ceiling 45 when the outer free end of the rod is extended through an aperture provided therefor in the ceiling 45. The panel 68 simply is removed from the trailer after first removing the spring biased supporting devices 72. Other means for removably supporting a central partition in a horse van are well known and may be employed with the trailer of this invention.

Interior sidewalls for the trailer, when the trailer is used for hauling, are provided by combination wall-floor panels 82A and 82B which are pivotally attached by hinge connecting means 84A and 84B to base boards 86A and 86B extending along the wheel well inner walls 40A and 40B, respectively. The wall-floor panels 82A and 82B are pivotal between upright vertical positions shown in full-line view in FIG. 3, where they form inner sidewalls, to overlapping horizontal positions shown in broken line in FIG. 3 where they constitute a raised double-thickness floor above the trailer bed 13. The panels 82A and 82B may be releasably latched or hooked to the inner edges of the well tops 34A and 34B in any suitable manner, not shown.

In the lowered, floor-forming position the panel 82A rests upon a supporting block 88 adjacent the base board 86B, and the panel 82B rests upon the panel 82A. The one hinge element 84B is located at a slightly higher level than the other hinge element 84A to permit such overlapping and horizontal positioning of the floor panels. The inner faces of the pivotal panels 82A and 82B are substantially free of protuberances which could harm animals transported in the trailer. Also, the panels, in the raised position, protect the bunks and table, and items stored between the inner wall panels 82A and 82B and the outer trailer walls 14A and 14B from the animals.

After occupancy of the trailer by horses, or the like, the trailer bed 13 may be readily swept and/or hosed out to clean the same. With the central partition 68 and supporting devices 72 removed from the trailer, the panels 82A and 82B may be pivoted into the horizontal position to provide a floor at a raised level above the bed 13. The outer face of the panel 82B in the vertical position, forms the upper face of the floor in the horizontal position thereof and such face is not exposed to the animals.

Feeding of horses in the trailer is readily accomplished by use of mangers placed upon the counters 50A and 66A at the front of the trailer. A suitable manger (for use at the counter 66A) is shown in FIG. 5A. There, a manger comprising a generally triangular-shaped base 92 with vertical sidewalls 94 is shown. Any suitable means, not shown, may be used for releasably securing the mangers to the counter tops. Also, the mangers may be of a height for storage between the bed 13 and floor panel 82A when the panel is in the lowered position. By making the mangers substantially the same height as the supporting block 88 the mangers when stored on the bed 13 as shown in broken line view of FIG. 4, provide added support for the panels 82A and 82B. As noted above, the large cabinets 28A and 28B within the rear doors 24A and 24B may be used to store feed such as hay, and the like, for use in feeding the horses. The front door 22 may be used for entering and leaving the trailer without having to walk past the horses therein.

Figure 2:
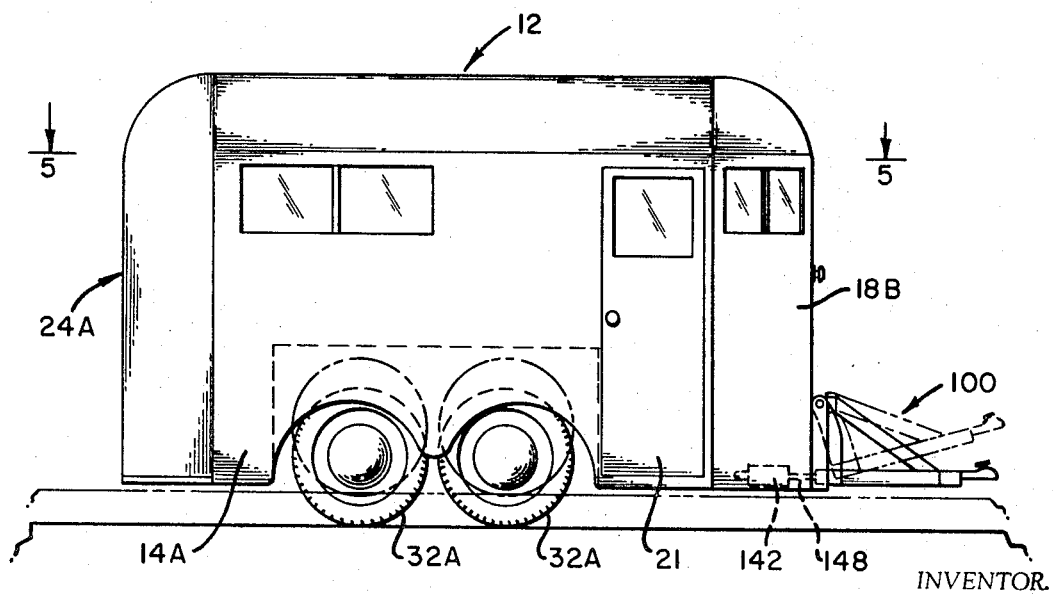
FIG. 2 is a side elevational view of the trailer shown in FIG. 1.

To facilitate loading and unloading of the trailer, and entering and departing the trailer while it is stationary, the trailer body may be lowered adjacent the ground such as illustrated in the broken line showing the wheels in FIG. 2. The towing hitch assembly identified generally by the reference numeral 100 is pivotally mounted about a horizontal axis for vertical pivotal movement whereby the trailer may be raised and lowered while attached to the towing vehicle, and while maintaining the trailer horizontally level. Vertically adjustable wheels and hitches for trailers are known, and such wheel and hitch arrangements may be used with the trailer of this invention, However, novel vertically adjustable wheel and hitch means such as shown in FIGS. 8—11 are preferred, to which FIGS. reference is now made.

The trailer frame 102 to which the trailer body is secured by suitable means not shown comprises an open horizontal boxlike portion 104 having a pair of spaced side members 106A and 106B interconnected by space forward and rear members 108 and 110, respectively. Vertical box frame sections 112A and 112B are provided at the side members 106A and 106B intermediate the opposite ends thereof and extend upwardly therefrom. The horizontal frame 104 is provided with sidewardly extending boxlike frame sections 114A and 114B adjacent the front end and similar but smaller frame sections 116A and 116B adjacent the rear end. Gusset plates 118 at the opposite ends of the vertical frames 112A and 112B add rigidity to the connection of the vertical frame sections 112A and 112B to the horizontal frame portion 104.

A front crosspiece 120 is located a spaced distance in front of the forward frame member 108 and is connected thereto by braces 122A and 122B extending between the outer ends thereof. A center brace 124 between the members 108 and 120 adds rigidity thereto. Vertical brackets 126A and 126B are fixed to and extend upwardly from the ends of the crosspiece 120, to which brackets the hitch assembly 100 is pivotally attached.

The hitch assembly is shown comprising a generally triangular-shaped frame 128 which includes a crossmember 130 at the rear thereof and a hitch member 132 at the front end. A central brace 134 extends between the hitch member 132 and crossmember 130. A conventional socket-type hitch member 132 may be used which is adapted for connection to a ball member included in a trailer hitch carried by the towing vehicle, not shown.

The hitch assembly is pivotally secured to the brackets 126A and 126B by use of generally vertically extending arms 136A and 136B attached to and extending upwardly from the ends of the crossmember 130, and by braces 138A and 138B, respectively, extending to the forward end of the frame 128. Pivot pins 140 adjacent the upper ends of the brackets 126A and 126B pivotally connect the hitch assembly 100 and 126B pivotally thereto. Thus, it will be seen that the hitch assembly is pivotally movable about the horizontal axis of the pins 140 for up and down movement of hitch member 132 which connects to the towing vehicle.

Pivotal movement of the hitch assembly is under control of a fluid cylinder 142 pivotally connected by pin 144 to a bracket 146 secured to the member 108. A piston (not shown) within the cylinder is connected through a piston rod 148 to the crossmember 130 of the hitch assembly. In the retracted position of the piston the hitch assembly 100 extends substantially horizontally as shown in full view of FIG. 2. Suitable locking means, not shown, may be used to releasably lock the hitch assembly in this position. When the trailer body is to be lowered, the lock is released and the fluid cylinder is energized to extend the piston rod 148 thereby pivoting the hitch assembly upwardly into the broken line position shown in FIG. 2.

Figure 9:
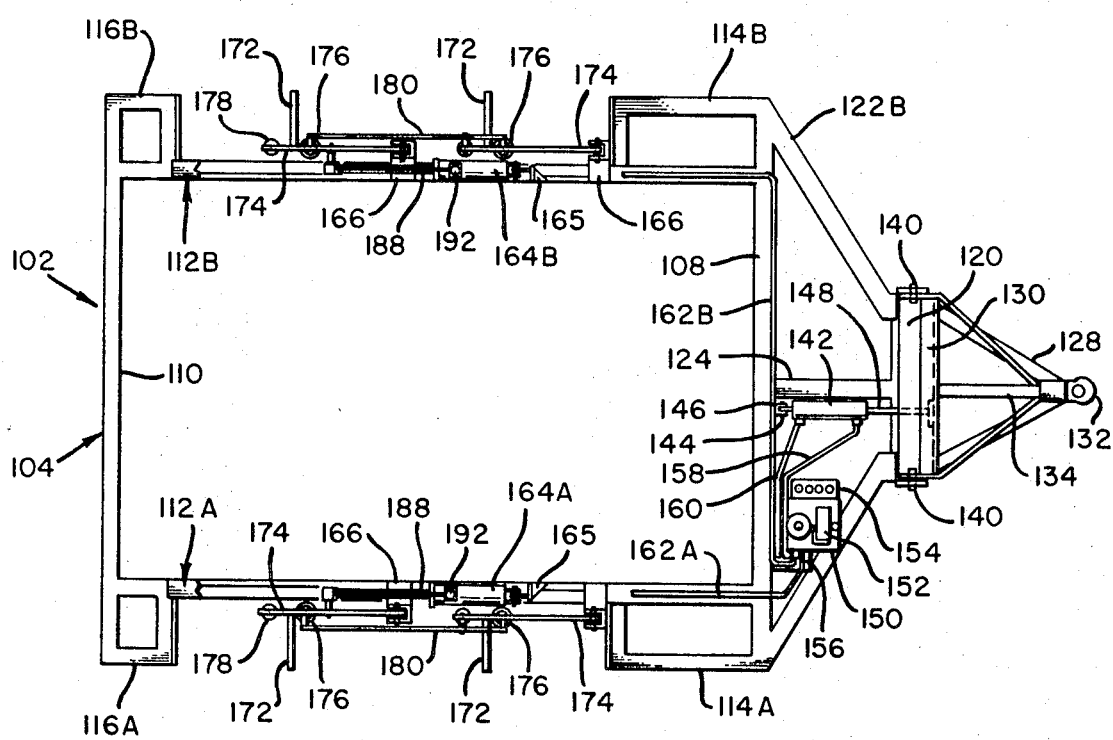
FIG. 9 is a top plane view of the trailer frame.

A fluid pressure source for the hitch cylinder 142 (and for the wheel actuators for raising and lowering the wheels, described below) may be included in the trailer In FIG. 9 a platform 150 is shown suitably secured to the trailer frame upon which platform are mounted a motor-driven hydraulic pump 152 and battery 154 for energizing the pump motor. Suitable flow control valves 156 connect the pump to hydraulic hoses 158 and 160 leading to the cylinder 142, and to hoses 162A and 162B for raising and lowering the trailer body in a manner described below. One end of the wheel-actuating cylinders are pivotally secured to brackets 165 extending from the vertical box frame sections 112A and 112B.

Figure 8:
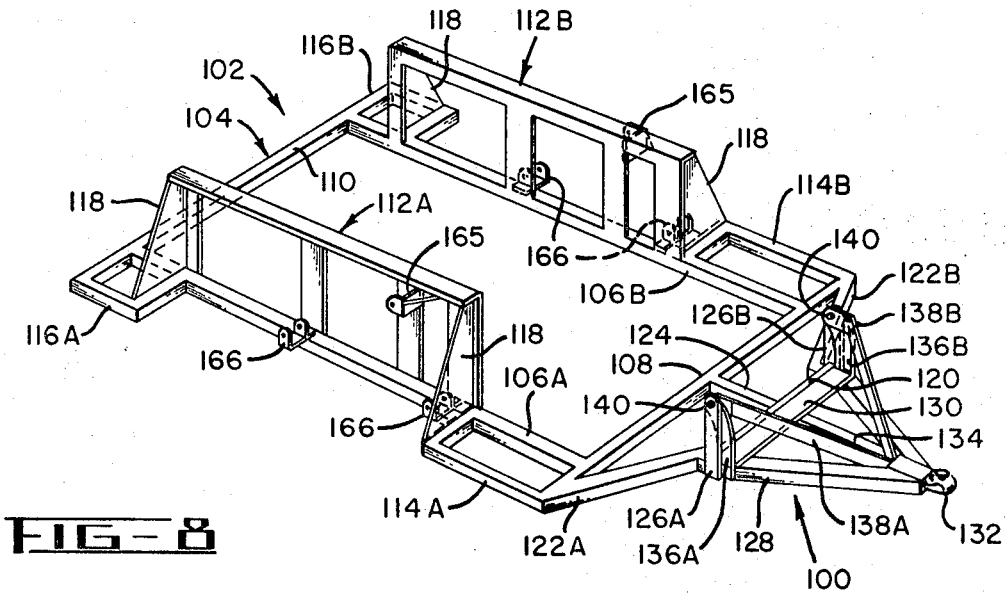
FIG. 8 is a perspective view of the trailer frame.
Figure 10:
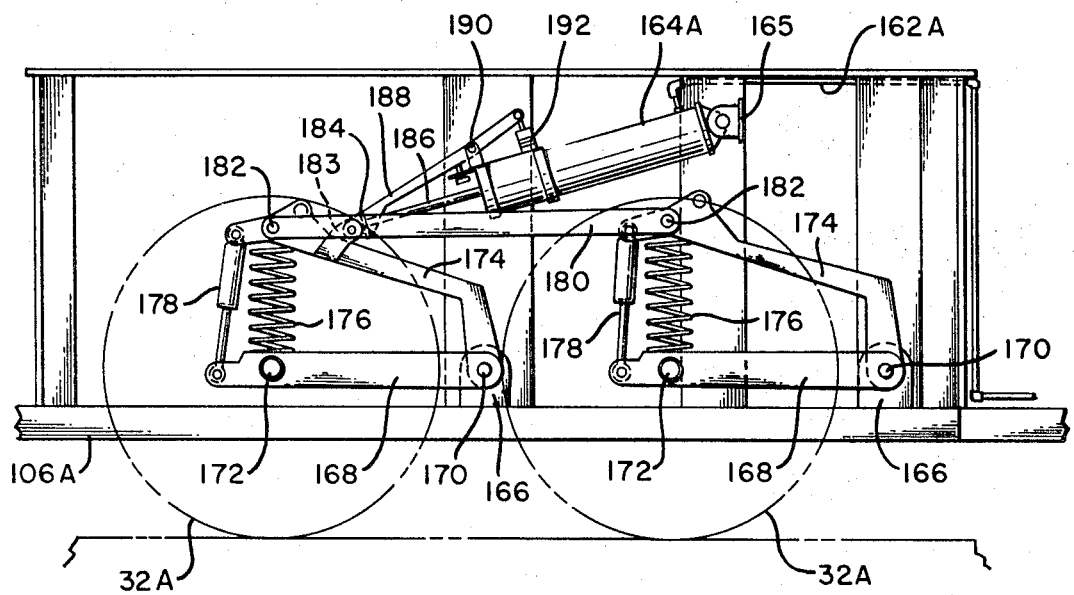
FIG. 10 is an enlarged fragmentary side elevational view of the novel wheel mounting arrangement showing the wheels in extended position.
Figure 11:
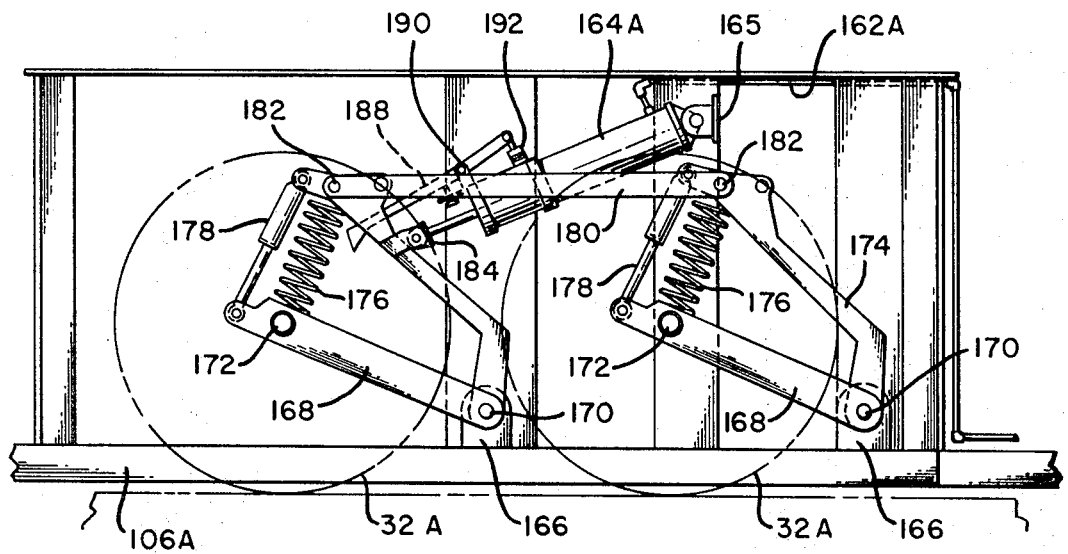
FIG. 11 is a view which is similar to that of FIG. 10 but showing the wheels in retracted position.

The novel wheel-retracting and extending mechanism for lowering and raising the trailer is shown in FIGS. 10 and 11. Since the mechanism for the wheels at one side of the trailer is substantially the same as the mechanism for the wheels at the other side, the mechanism at only one side of the trailer need be described. Also, as will become apparent, although tandem wheels are provided at each side of the trailer the mechanism is readily adapted for a trailer having a single wheel or dual wheels at each side. As seen in FIGS. 8 and 9 two supporting brackets 166 are secured to each of the side frame members 106A and 106B to which wheel carrying lever arms 168 are pivotally secured by pivot pins 170. A wheel axle 172 extends from each of the lever arms 168 for rotatable support of the wheels 32A and 32B. Inverted generally L-shaped lever arms 174 are also pivotally attached to the brackets 166 by the pivot pins 170, and a coil compression spring 176 and shock absorber 178 are positioned between each pair of lever arms 168 and 174 adjacent the outer free ends thereof. Any suitable connecting means may be used for connecting the spring and shock absorbers to the lever arms.

In the trailer raised (or wheel extended) position, the lever arms 174 are locked against pivotal movement by a suitable locking means. In the locked position, shown in FIG. 10, the one end portion of the lever 174 extends generally vertically upwardly and the outer end extends generally horizontally rearwardly. The lever arms 168 upon which the wheels are mounted are free to pivot about the pins 170 when the lever arms 174 are locked in position. Thus, it will be seen that the connection of the wheels to the frame includes springs and shock absorbers for spring suspension of the individual wheels for absorbing road shocks.

The lever arms 174 are shown interconnected by a connecting link 180 which is attached to the arms by pivot pins 182 for simultaneous rotation of both lever arms 174 when one is rotated as described below. The rearward lever arm 174 has an upwardly inclined arm portion 183 which is pivotally connected through a clevis 184 to the piston rod 186 of the fluid cylinder 164A. The rearward lever arm 174 may be locked in the position shown in FIG. 10 to maintain the trailer in the raised position. Suitable locking means includes a locking lever 188 pivotally attached to a bracket 190 secured to the fluid actuator 164A. One end of the locking lever 188 is adapted for engagement with the clevis 184 to lock the piston rod 186 in the extended position shown in FIG. 10. The other end of the locking lever is attached to a solenoid 192 which is mounted on the fluid cylinder. When the solenoid 192 is energized (as by use of the battery 154 shown in FIG. 9) the locking lever is rotated in a clockwise direction (as viewed in FIGS. 10 and 11) to disengage the locking arm from the clevis. Now, when fluid is released from the rear of the cylinder 164A through line 162A (by control of valve means 156 shown in FIG. 9) the piston is urged toward retracted position and the trailer body is lowered to the position shown in FIG. 11. To raise the trailer body, fluid under pressure is supplied to the cylinder through the fluid line to extend the piston rod thereby rotating the lever arms 174 in a counterclockwise direction. In the raised position the locking lever returns to engaged position with the clevis 184 when the piston rod 188 is extended.

The valve means 156 (FIG. 9) may be arranged for simultaneously supplying fluid, at the proper rate, to the wheel cylinders 164A and 164B, and to the hitch cylinder 142 to effect simultaneous extension of the wheel cylinder piston rods 186 and retraction of the hitch cylinder piston rod 148. Alternatively, the valve means may include separate control valves for the hitch cylinder and the two wheel cylinders. With either arrangement the trailer may remain hitched to the towing vehicle while raising and lowering the trailer body. It will be apparent that ingress and egress are greatly simplified when the trailer body is lowered adjacent the ground. No ramps are required for loading of horses or the like. When the trailer body is raised the body is fully spring mounted to provide a smooth ride for the horses and/or other trailer contents.

The invention having been described in detail in accordance with the requirements of the Patent Statutes, various changes and modifications may suggest themselves to those skilled in this art and it is intended that such changes and modifications shall fall within the spirit and scope of the invention defined in the appended claims.

I claim:

1. A vehicle of the character described adapted to function as a horse trailer or the like and as a mobile dwelling or shelter for human beings, comprising:
   a. a generally horizontal frame;
   b. wheels supporting the frame for travel along a road;
   c. a housing structure supported on the frame, said housing structure including sidewalls, end walls, a roof and a floor spaced from one another to provide a dwelling or storage space; and
   d. a panel structure comprising two panels hingedly supported on opposite sides of the housing structure to pivot between (1) a vertical position to provide inner walls spaced from one another and from the sidewalls of the housing and to form an interior space for storage or for transport of animals or small vehicles and (2) a horizontal position to form a raised floor spaced from and above the floor of the housing structure and to provide a dwelling space wider than such storage space, said panels in their vertical positions being spaced from said sidewalls sufficiently to accommodate folded seating and reclining fixtures.

2. The vehicle of claim 1 wherein seating and reclining fixtures are located in the spaces between the vertical panels and the sidewalls.

3. The vehicle of claim 2 wherein said fixtures include at least some that are foldable to a compact, nonoperative position while the panels are erect and are unfoldable to useable, operable seating and reclining structures when the panels are horizontal.

4. The vehicle of claim 1 including a door in the rear wall of the housing structure which can be opened and closed and means for elevating and lowering the housing structure whereby it can be elevated to and maintained in an elevated position for road travel and lowered to and maintained in a lowered position to facilitate loading and unloading and for use while the vehicle is stationary as a dwelling or shelter.